(12) United States Patent
Lin et al.

(10) Patent No.: US 12,296,270 B2
(45) Date of Patent: May 13, 2025

(54) METHOD AND APPARATUS FOR GENERATING VIRTUAL EQUIPMENT, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Lin Lin, Shenzhen (CN); Guoqing Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 166 days.

(21) Appl. No.: 18/073,415

(22) Filed: Dec. 1, 2022

(65) Prior Publication Data
US 2023/0101933 A1    Mar. 30, 2023

Related U.S. Application Data

(63) Continuation of application No. PCT/CN2021/122535, filed on Oct. 8, 2021.

(30) Foreign Application Priority Data

Nov. 6, 2020 (CN) .......................... 202011232387.5

(51) Int. Cl.
*A63F 13/63* (2014.01)
(52) U.S. Cl.
CPC .................................. *A63F 13/63* (2014.09)
(58) Field of Classification Search
CPC ........ A63F 13/63; A63F 13/533; A63F 13/42; A63F 13/55
See application file for complete search history.

(56) References Cited

U.S. PATENT DOCUMENTS 10,970,843 B1 * 4/2021 Olsen ................. H04N 21/4316
2007/0167221 A1   7/2007 Walker et al.
(Continued)

FOREIGN PATENT DOCUMENTS

CN    110064193 A    7/2019
CN    111202979 A    5/2020
(Continued)

OTHER PUBLICATIONS

China National Intellectual Property Administration (CNIPA) Office Action 1 for 202011232387.5, Apr. 28, 2021 19 Pages (including translation).
(Continued)

*Primary Examiner* — Chase E Leichliter
(74) *Attorney, Agent, or Firm* — ANOVA LAW GROUP PLLC

(57) ABSTRACT

This application discloses a method and apparatus for generating virtual equipment, a storage medium, and an electronic device. The method includes displaying identifiers of virtual equipment in a target game interface, the virtual equipment comprising first virtual equipment and second virtual equipment; receiving a first triggering operation performed on the identifier of the first virtual equipment from the target game interface; in response to the first triggering operation, displaying a candidate identifier of a first fused virtual equipment, the first fused virtual equipment is a fusion of the second virtual equipment and the first virtual equipment in the target game interface; and in response to dragging the identifier of the first virtual equipment and dropping the identifier at a position overlapped with an identifier of the second virtual equipment, fusing the second virtual equipment and the first virtual equipment.

18 Claims, 9 Drawing Sheets

(56) References Cited

U.S. PATENT DOCUMENTS

| | | | |
|---|---|---|---|
| 2014/0200084 A1* | 7/2014 | Butler | A63F 13/00 463/43 |
| 2015/0065255 A1* | 3/2015 | Otomo | A63F 13/69 463/43 |
| 2015/0151204 A1* | 6/2015 | Yamaguchi | A63F 13/2145 463/31 |
| 2015/0265927 A1* | 9/2015 | Taylor | A63F 13/69 463/9 |
| 2016/0067601 A1 | 3/2016 | Mehra et al. | |
| 2018/0093180 A1* | 4/2018 | Yamanokuchi | A63F 13/40 |
| 2019/0060764 A1* | 2/2019 | Otomo | A63F 13/825 |
| 2020/0346113 A1* | 11/2020 | Sun | A63F 13/837 |
| 2020/0360817 A1 | 11/2020 | Otomo | |
| 2021/0346804 A1* | 11/2021 | Otomo | A63F 13/335 |
| 2023/0101933 A1* | 3/2023 | Lin | A63F 13/63 463/31 |
| 2023/0233934 A1 | 7/2023 | Yamanokuchi et al. | |
| 2023/0249072 A1* | 8/2023 | Otomo | A63F 13/69 463/31 |

FOREIGN PATENT DOCUMENTS

| | | |
|---|---|---|
| CN | 111475087 A | 7/2020 |
| CN | 111617473 A | 9/2020 |
| CN | 112221126 A | 1/2021 |
| JP | H1195650 A | 4/1999 |
| JP | 2014213203 A | 11/2014 |
| JP | 2016137199 A | 8/2016 |
| JP | 2017196195 A | 11/2017 |
| JP | 2018051222 A | 4/2018 |

OTHER PUBLICATIONS

The World Intellectual Property Organization (WIPO) International Search Report for PCT/CN2021/122535 Jan. 6, 2022 8 Pages (including translation).

"The brave love synthesis V1.7", Apr. 29, 2019.

"MergeDragonsV3 .10.0", Jun. 15, 2020, https://www.cr173.com/azyx/572394.html.

League of Legends Official,"Non-official translation: Teamfight Tactics Beginner's Guide: Items and Process, Jul. 8, 2019",https://v.qq. com/x/page/z08951n56iu.html.

League of Legends Official. "Non-official translation: Right click on items to check build paths in new version? Increased need for Frozen Heart?", Jul. 30, 2020, https://lol.qq.com/news/detail. shtml ?docid=13024964975733319248.

The Japan Patent Office (JPO) Notification of Reasons for Refusal for Application No. 2023-515024 and Translation Mar. 4, 2024 Pages.

Korean Intellectual Property Office (KIPO) Office Action 1 for Application No. 2023-7010812 Jan. 7, 2025 28 Pages (including translation).

* cited by examiner

METHOD AND APPARATUS FOR GENERATING VIRTUAL EQUIPMENT, STORAGE MEDIUM, AND ELECTRONIC DEVICE

RELATED APPLICATIONS

This application is a continuation application of PCT Application No. PCT/CN2021/122535, filed on Oct. 8, 2021, which in claims priority to Chinese Patent Application No. 202011232387.5, entitled "METHOD AND APPARATUS FOR GENERATING VIRTUAL EQUIPMENT, STORAGE MEDIUM, AND ELECTRONIC DEVICE" and filed with the National Intellectual Property Administration, PRC on Nov. 6, 2020. both of which are incorporated herein by reference in their entirety.

FIELD OF THE TECHNOLOGY

This application relates to the field of computers, and specifically to generation of virtual equipment.

BACKGROUND OF THE DISCLOSURE

Equipment combination is a common operation in games. However, in some games, equipment combination pathways are generally in a tree structure, and players can view advanced equipment only after calling a tree diagram by clicking an equipment icon. Therefore, the pathways are complex in operation, the players cannot memorize and use equipment easily and further cannot rapidly preview the equipment to make a strategic decision.

SUMMARY

Therefore, embodiments of this application provide a method and apparatus for generating virtual equipment, a storage medium, and an electronic device, to at least solve the technical problem of low efficiency caused by complex operation of equipment combination in games.

One aspect of the embodiments of this application provides a method for generating virtual equipment. The method includes displaying identifiers of virtual equipment in a target game interface, the virtual equipment comprising first virtual equipment and second virtual equipment; receiving a first triggering operation performed on the identifier of the first virtual equipment from the target game interface; in response to the first triggering operation, displaying a candidate identifier of a first fused virtual equipment, the first fused virtual equipment is a fusion of the second virtual equipment and the first virtual equipment in the target game interface; and in response to dragging the identifier of the first virtual equipment and dropping the identifier at a position overlapped with an identifier of the second virtual equipment, fusing the second virtual equipment and the first virtual equipment.

According to still another aspect of the embodiments of this application, a non-transitory computer-readable storage medium is further provided, the computer-readable storage medium storing a computer program, and the computer program being configured to perform the method for generating virtual equipment in the foregoing aspect when run.

According to still another aspect of the embodiments of this application, an electronic device is further provided. The electronic device includes a memory and a processor, the foregoing memory storing a computer program, and the foregoing processor being configured to perform the method for generating virtual equipment in the foregoing aspect through the foregoing computer program.

In the embodiments of this application, the identifier of the virtual equipment obtained by the target virtual role is displayed in a target game interface; the first triggering operation performed on the identifier of the first virtual equipment is acquired from the target game interface, and the virtual equipment obtained includes the first virtual equipment; in response to the first triggering operation, the identifier of the virtual combined equipment obtained by combining the target virtual equipment and the first virtual equipment is displayed in the target game interface, and the target virtual equipment is virtual equipment that is allowed to be combined with the first virtual equipment; and in response to dragging the identifier of the first virtual equipment and dropping to the position overlapped with the identifier of the second virtual equipment, the second virtual equipment and the first virtual equipment are combined in the target game interface to obtain the target combined equipment corresponding to the combined equipment identifier. Under the guidance of combined equipment identifiers, users can complete targeted equipment combination by only performing simple touch and dragging operations to achieve the aim of simplifying equipment combination, thereby realizing the technical effect of improving the efficiency of equipment combination in games, and furthermore, solving the technical problem of low efficiency caused by complex operation of equipment combination in games.

DESCRIPTION OF EMBODIMENTS

To make a person skilled in the art better understand solutions of this application, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

It should be noted that: In the specification, claims, and accompanying drawings of this application, the terms "first", "second", and so on are intended to distinguish between similar objects but do not necessarily indicate a specific order or sequence. It should be understood that the data so used may be interchanged in an appropriate condition, so that the embodiments of the present disclosure described herein can be implemented in an order other than those illustrated or described herein. Moreover, the terms "include," "comprise", and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In miniature wargames, the combination of advanced equipment is based on chess pieces used as carriers. For example, the advanced equipment can be obtained only after the chess pieces are decorated by two pieces of basic items to generate advanced equipment and are then sold. This process is long and complex, involves many interactive hot spots and interactive operations, and takes a long time, which does not provide a smooth game experience for the players.

Figure 1:
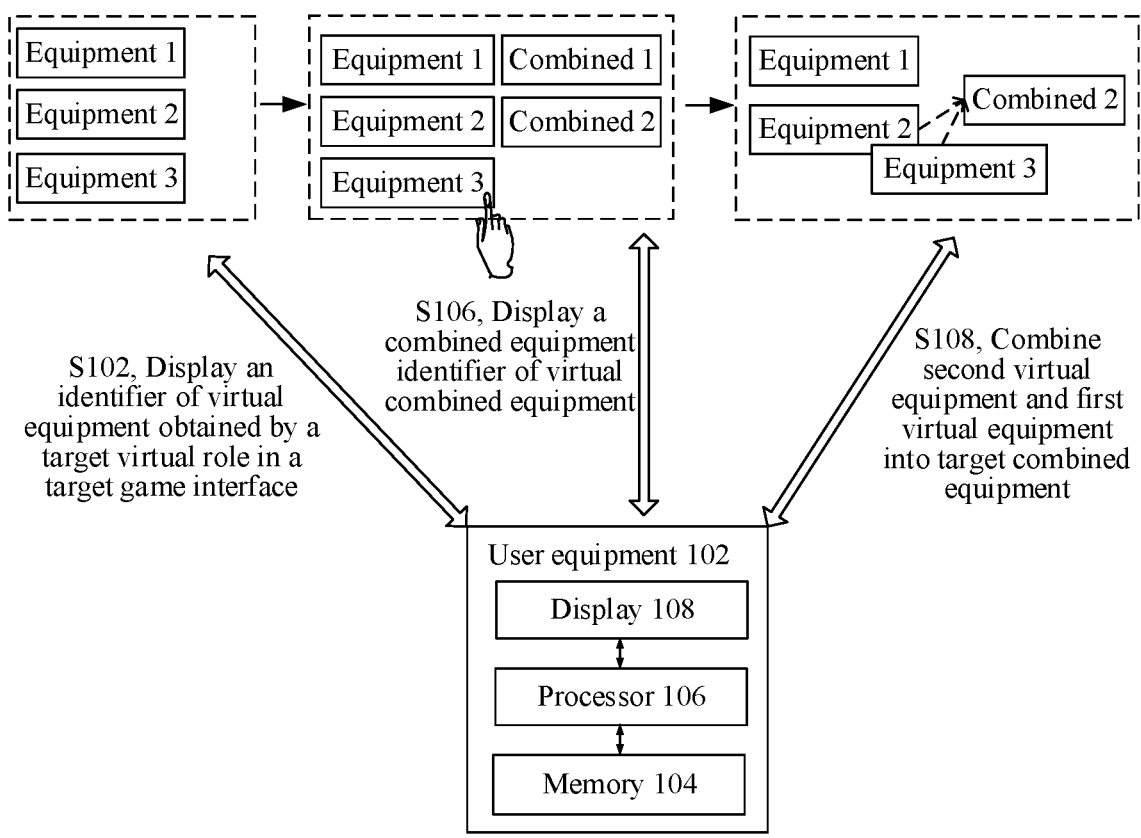
FIG. 1 is a schematic diagram of an application environment of an optional method for generating virtual equipment according to an embodiment of this application.

According to one aspect of the embodiments of this application, a method for generating virtual equipment without using a carrier for equipment generation (e.g., a chess piece) is provided. In some embodiments, the method for generating virtual equipment is applicable to, but not limited to, a system for generating virtual equipment in the environment shown in FIG. 1. The system includes user equipment 102, which may include a memory 104, a processor 106, and a display 108.

In some embodiments, in this embodiment, the user equipment 102 may be a terminal device configured with a target client, and may include but is not limited to at least one of the following: a mobile phone (for example, an Android mobile phone, or an iOS mobile phone), a notebook computer, a tablet computer, a palmtop computer, a mobile Internet device (MID), a PAD, a desktop computer, and a smart TV. The target client may be a game client.

The foregoing description is merely an example, and this is not limited in this embodiment.

In particular, the following steps may be performed by means of the system for generating virtual equipment:

S102: Display an identifier of virtual equipment obtained by a target virtual role in a target game interface, the virtual equipment obtained including first virtual equipment and second virtual equipment;

S104: Receive a first triggering operation performed on the identifier of the first virtual equipment from the target game interface.

S106: In response to the first triggering operation, display a combined equipment identifier of virtual combined equipment obtained by combining the target virtual equipment and the first virtual equipment in the target game interface, the target virtual equipment being virtual equipment that is allowed to be combined with the first virtual equipment and including the second virtual equipment.

S108: In response to dragging the identifier of the first virtual equipment and dropping to a position overlapped with an identifier of the second virtual equipment, combine the second virtual equipment and the first virtual equipment in the target game interface into target combined equipment corresponding to the combined equipment identifier.

Figure 2:
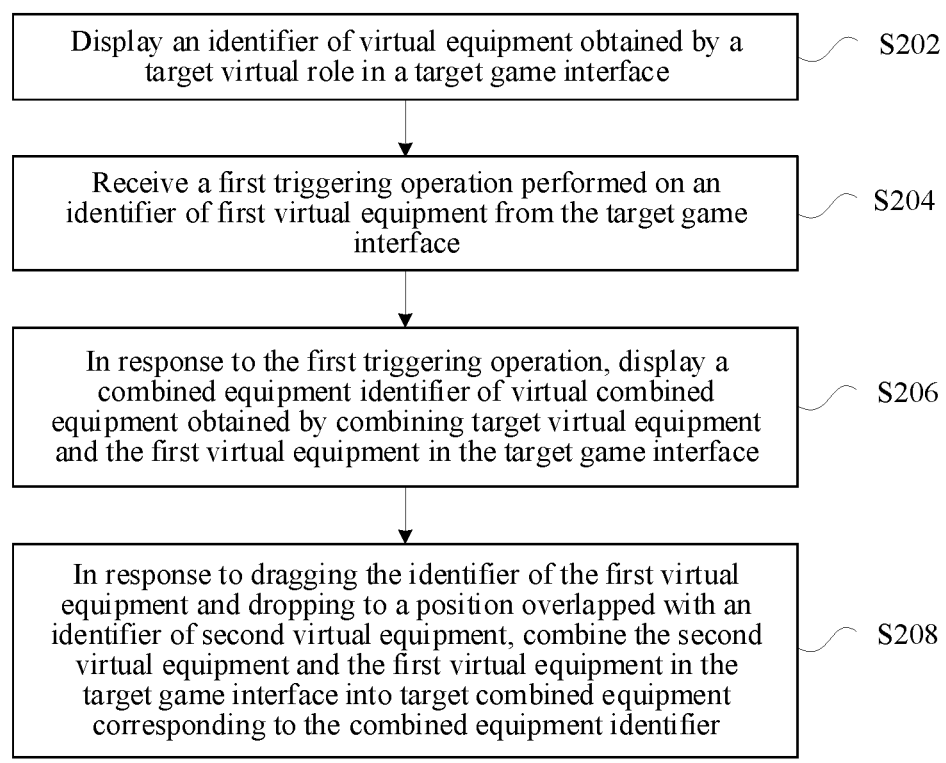
FIG. 2 is a schematic flowchart of an optional method for generating virtual equipment according to an embodiment of this application.

In some embodiments, as shown in FIG. 2, the method for generating virtual equipment includes the following steps:

S202: Display an identifier of virtual equipment obtained by a target virtual role in a target game interface.

S204: Receive a first triggering operation performed on the identifier of the first virtual equipment from the target game interface, the virtual equipment obtained including the first virtual equipment.

S206: In response to the first triggering operation, display a combined equipment identifier of virtual combined equipment obtained by combining the target virtual equipment and the first virtual equipment in the target game interface, the target virtual equipment being virtual equipment that is allowed to be combined with the first virtual equipment.

S208: In response to dragging the identifier of the first virtual equipment and dropping to a position overlapped with an identifier of the second virtual equipment, combine the second virtual equipment and the first virtual equipment in the target game interface into target combined equipment corresponding to the combined equipment identifier.

By means of the above-mentioned steps, the identifier of the virtual equipment obtained by the target virtual role is displayed in the target game interface; the first triggering operation performed on the identifier of the first virtual equipment is acquired from the target game interface, and the virtual equipment obtained includes the first virtual equipment; in response to the first triggering operation, the identifier of the virtual combined equipment obtained by combining the target virtual equipment and the first virtual equipment is displayed in the target game interface, and the target virtual equipment is virtual equipment that is allowed to be combined with the first virtual equipment; and in response to dragging the identifier of the first virtual equipment and dropping to the position overlapped with the identifier of the second virtual equipment, the second virtual equipment and the first virtual equipment are combined in the target game interface into the target combined equipment corresponding to the combined equipment identifier. Under the guidance of combined equipment identifiers, users can complete targeted equipment combination by only performing simple touch and dragging operations to achieve the aim of simplifying equipment combination, thereby realizing the technical effect of improving the efficiency of equipment combination in games, and furthermore, solving the technical problem of low efficiency caused by complex operation of equipment combination in games.

Figure 3:
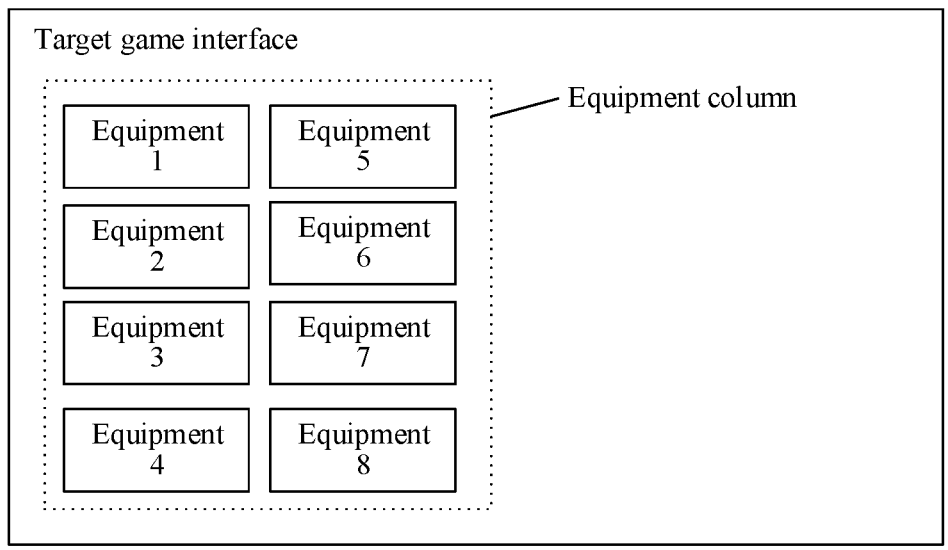
FIG. 3 is the first schematic diagram of an optional game interface according to an embodiment of this application.

In one embodiment, a target game may be a chess game, a shooting game, or any type of game including virtual equipment and a virtual equipment combination mechanism. During the start of a new game, a player enters a game interface, and an identifier of virtual equipment obtained may be displayed on an equipment column of the game interface. The identifier of virtual equipment in this embodiment may be an icon or a name of the virtual equipment, etc. FIG. 3 is the first schematic diagram of an optional game interface according to an embodiment of this application. The game interface includes an equipment column, in which identifiers of Equipment 1, Equipment 2, Equipment 3 and other virtual equipment are displayed. The identifiers of Equipment 1, Equipment 2, Equipment 3 and other virtual equipment are used only to illustrate that different types of equipment are displayed in the figure. Specifically, the icon or name of virtual equipment may be displayed on the equipment column, and the specific content displayed may be determined according to actual conditions, which is not limited herein.

Figure 4:
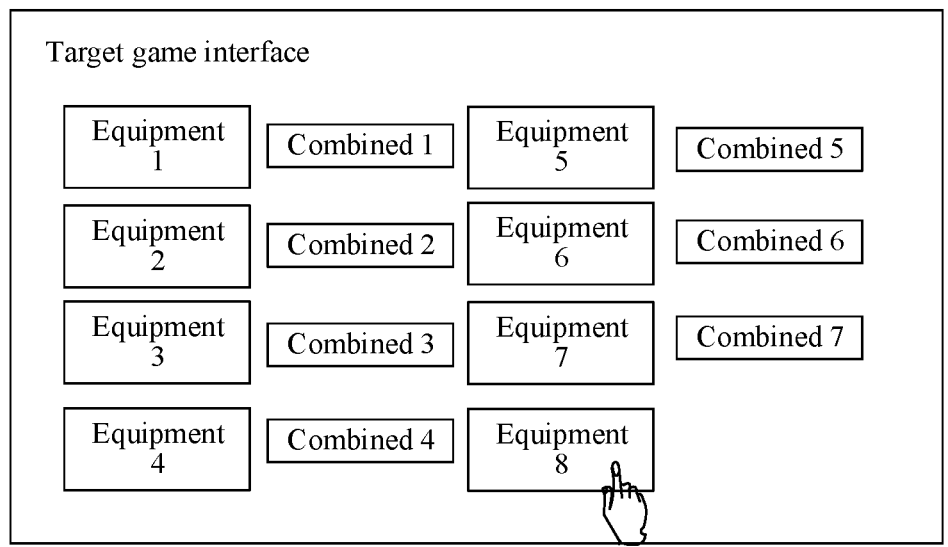
FIG. 4 is the second schematic diagram of an optional game interface according to an embodiment of this application.

In one embodiment, the first triggering operation above may be a touch operation, a click operation, or a dragging operation. The target virtual equipment may be equipment that can be combined with the first virtual equipment. In this embodiment, it is assumed that the first virtual equipment is Equipment 8, other equipment (Equipment 1 to Equipment 7) except for Equipment 8 in the equipment column may be combined with Equipment 8. FIG. 4 is the second schematic diagram of an optional game interface according to an embodiment of this application. In the game interface, a player may click or drag Equipment 8 to implement a first triggering operation, and a target game responds to the first triggering operation to display an identifier of virtual combined equipment that can be obtained by combining Equipment 8 and other equipment in the game interface, for example, an identifier "Combined 1" displayed in the target game interface as shown in FIG. 4 represents that Equipment 8 and Equipment 1 may be combined into combined virtual equipment "Combined 1". In this embodiment, when identifiers of combinable virtual combined equipment, a role of prompting may be played, prompting the player that combined equipment to be obtained can be selected from a plurality of target virtual equipment that can be combined.

Figure 5:
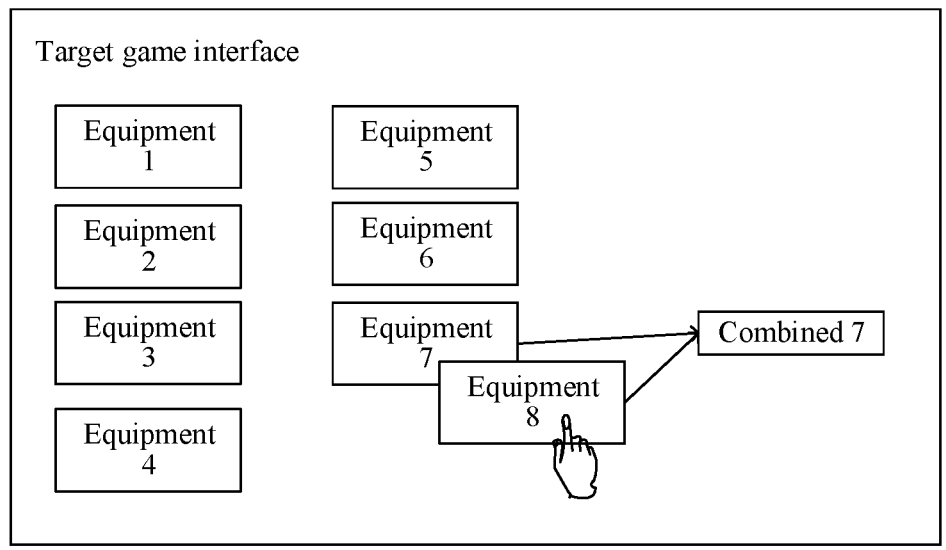
FIG. 5 is the third schematic diagram of an optional game interface according to an embodiment of this application.

In one embodiment, it is assumed that a player selects "Equipment 8" and "Equipment 7", as shown in the third schematic structural diagram of the target game interface in FIG. 5, the player may drag "Equipment 8" to a position where "Equipment 7" resides. When "Equipment 8" and "Equipment 7" are overlapped in position, "Equipment 8" and "Equipment 7" are combined to obtain target combined equipment "Combined 7", and "Combined 7" can be displayed in the equipment column as new virtual equipment obtained by the player. In this embodiment, a target virtual role is a role manipulated by the player in the game. The player may control the target virtual role by touching operation keys in the game, for example, may control the target virtual role to use newly combined target combined equipment "Combined 7" to attack enemies. In this embodiment, the player can implement the combination of equipment by performing dragging operation without using a carrier for equipment generation, such as a chess piece, for equipment making, which is simple to operate and highly efficient, thereby improving the game operation experience of the player.

In some embodiments, S106 includes: when the target virtual equipment includes a plurality of pieces of first-class equipment, displaying a combined equipment identifier of virtual combined equipment obtained by combining the plurality of pieces of first-class equipment and the first virtual equipment in the target game interface, respectively, the first-class equipment being target virtual equipment that is allowed to be combined with the first virtual equipment separately to obtain the virtual combined equipment.

In one embodiment, in the game interface shown in FIG. 4, each virtual equipment in "Equipment 1" to "Equipment 7" is allowed to be combined with "Equipment 8" separately, that is, "Equipment 1" to "Equipment 7" are all first-class equipment. The identifiers of virtual combined equipment that can be obtained by combining each virtual equipment in "Equipment 1" to "Equipment 7" with "Equipment 8" separately are displayed on the game interface shown in FIG. 4, for example, "Equipment 1" and "Equipment 8" can be combined separately into "Combined 1" and "Equipment 2" and "Equipment 8" can be combined separately into "Combined 2". In this embodiment, by displaying a combined equipment identifier of virtual combined equipment that can be obtained by combining each first-class equipment with first virtual equipment separately in the game interface, a role of prompting may be played, prompting the player that combined equipment to be obtained can be selected from a plurality of pieces of first-class equipment that can be combined separately.

In some embodiments, the plurality of pieces of first-class equipment may include N pieces of first-class equipment; displaying a combined equipment identifier of virtual combined equipment obtained by combining the plurality of pieces of first-class equipment and the first virtual equipment in the target game interface, respectively, includes: displaying combined equipment identifiers of N pieces of virtual combined equipment at positions adjacent to the identifiers of the N pieces of first-class equipment in the target game interface.

In one embodiment, the N pieces of first-class equipment may be "Equipment 1" to "Equipment 7" in the game interface shown in FIG. 4, and each of "Equipment 1" to "Equipment 7" is allowed to be combined with "Equipment 8" separately. A combined equipment identifier of virtual combined equipment that can be obtained by combining each first-class equipment in "Equipment 1" to "Equipment 7" with "Equipment 8" separately is displayed in the game interface shown in FIG. 4, for example, "Equipment 1" and "Equipment 8" can be combined separately into "Combined 1" and "Equipment 2" and "Equipment 8" can be combined separately into "Combined 2". In addition, the combined equipment identifier of each virtual combined equipment and the identifier of the corresponding first-class equipment may be placed adjacently, for example, in FIG. 4, the combined equipment identifier "Combined 1" of the virtual combined equipment is displayed at a position adjacent to "Equipment 1", and "Combined 2" is displayed at a position adjacent to "Equipment 2". In this embodiment, the adjacent display manner may be set according to an actual situation and may be in up and down or left and right directions. For example, "Combined 1" may be displayed in four adjacent directions of "Equipment 1", such as up, down, left and right. FIG. 4 illustrates this embodiment only as an example, and the present disclosure is not limited thereto. In this embodiment, by displaying a combined equipment identifier of virtual combined equipment that can be obtained by combining each first-class equipment with first virtual equipment separately in the game interface, a role of prompting may be played, prompting the player that virtual combined equipment to be obtained can be selected from a plurality of pieces of first-class equipment.

In some embodiments, the displaying combined equipment identifiers of N pieces of virtual combined equipment at positions adjacent to the identifiers of the N pieces of first-class equipment in the target game interface includes: displaying rightward from positions of the identifiers of the N pieces of first-class equipment to display the combined equipment identifiers of the N pieces of virtual combined equipment in the target game interface.

Figure 6:
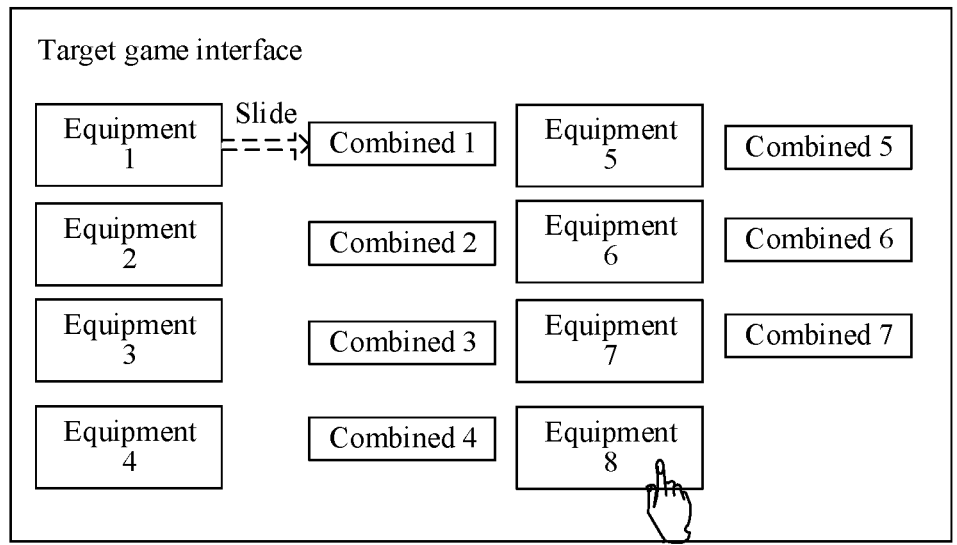
FIG. 6 is the fourth schematic diagram of an optional game interface according to an embodiment of this application.

In one embodiment, the combined equipment identifier of the virtual combine equipment may be dynamically displayed by sliding. For example, when the combined equipment identifier is displayed at the right side of the corresponding first-class equipment, the combined equipment identifier of the corresponding virtual combined equipment may be displayed by displaying rightward from a position where the identifier of the first-class equipment resides. In the fourth schematic diagram of the target game interface shown in FIG. 6, the identifier "Combined 1" is displayed by displaying rightward from a position where "Equipment 1" resides. In this embodiment, the combined equipment identifiers of the N pieces of virtual combined equipment may be displayed simultaneously or successively. For example, in FIG. 5, "Combined 1" to "Combined 7" may be displayed simultaneously by displaying rightward, and may also be displayed successively by sliding. For example, after "Combined 1" is displayed by sliding and "Combined 2" is displayed by sliding; by analogy, "Combined 7" is displayed by sliding. The time interval for displaying successively may be determined according to an actual situation, for example, may be 0.5s, 1s and so on. In this embodiment, a dynamic game interface may be shown in a manner of displaying by displaying rightward to improve the visual experience of players.

In some embodiments, S106 includes: when the target virtual equipment includes a virtual equipment subset with a plurality of pieces of second-class equipment, displaying a combined equipment identifier of virtual combined equipment obtained by combining the virtual equipment subset and the first virtual equipment in the target game interface, the plurality of pieces of second-class equipment in the virtual equipment subset being allowed to be together combined with the first virtual equipment to obtain one piece of virtual combined equipment; or when the target virtual equipment includes the virtual equipment subset and the first-class equipment, displaying a combined equipment identifier of virtual combined equipment obtained by combining the virtual equipment subset and the first virtual equipment in the target game interface, and displaying a combined equipment identifier of virtual combined equipment obtained by combining the first-class equipment and the first virtual equipment, the first-class equipment being target virtual equipment that is allowed to be combined with the first virtual equipment separately to obtain the virtual combined equipment.

Figure 7:
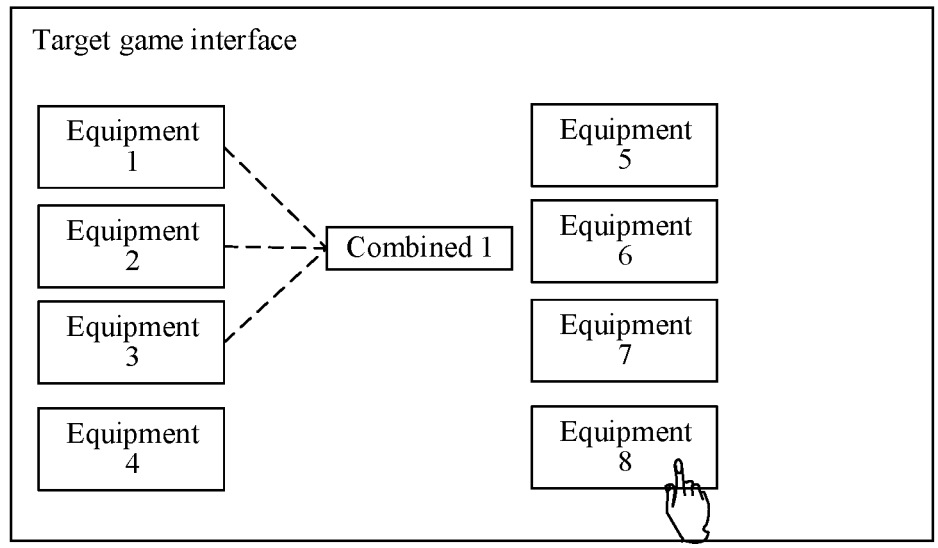
FIG. 7 is the fifth schematic diagram of an optional game interface according to an embodiment of this application.

In one embodiment, the first virtual equipment may be combined with a plurality of pieces of second-class equipment simultaneously, and the plurality of pieces of second-class equipment that can be used for simultaneous combination are of the same type. In this embodiment, the fifth schematic diagram of the target game interface shown in FIG. 7 shows that the first virtual equipment is "Equipment 8", including second-class equipment: virtual equipment subsets of "Equipment 1", "Equipment 2" and "Equipment 3" can be combined with "Equipment 8" simultaneously to obtain "Combined 1". When the first triggering operation is performed on "Equipment 8", such as a clicking or dragging operation, the combined equipment identifier "Combined 1" of obtainable virtual combined equipment is displayed in the interface shown in FIG. 7.

Figure 8:
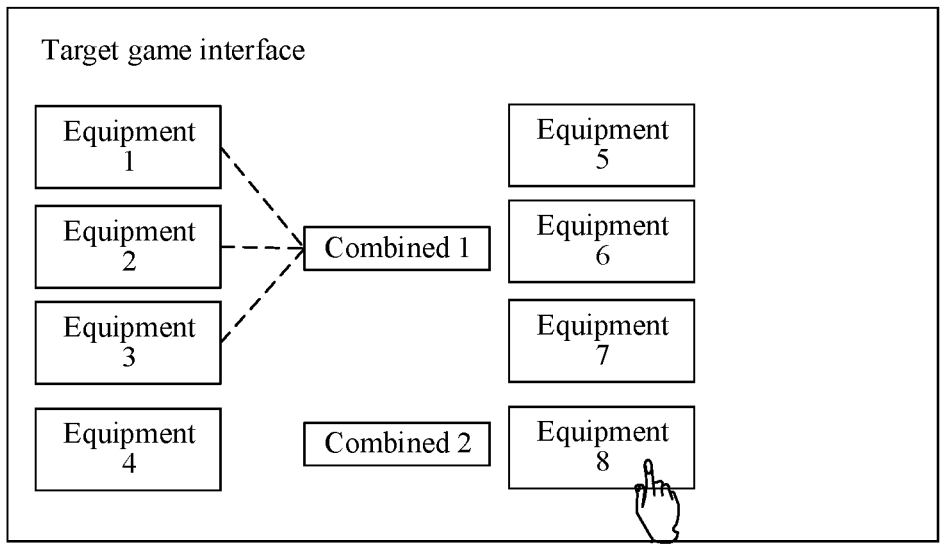
FIG. 8 is the sixth schematic diagram of an optional game interface according to an embodiment of this application.

In one embodiment, the first virtual equipment may be combined with a plurality of pieces of second-class equipment simultaneously, and may also be combined with one piece of first-class equipment separately. The plurality of pieces of second-class equipment that can be used for simultaneous combination are of the same type. The sixth schematic diagram of the target game interface shown in FIG. 8 shows that the first virtual equipment is Equipment 8; "Equipment 1", "Equipment 2" and "Equipment 3" can be combined with "Equipment 8" simultaneously into "Combined 1"; and "Equipment 1", "Equipment 2" and "Equipment 3" are second-class equipment and "Equipment 1", "Equipment 2" and "Equipment 3" belong to the same virtual equipment subset. "Equipment 4" may be combined with "Equipment 8" separately into "Combined 2". When the first triggering operation is performed on "Equipment 8", such as a clicking or dragging operation, the identifiers "Combined 1" and "Combined 2" of obtainable virtual combined equipment are displayed in the interface shown in FIG. 8. In this embodiment, the plurality of pieces of virtual equipment are combined with the first virtual equipment simultaneously, such that the interesting of games can be increased and the operation experience of players can be improved.

In some embodiments, the number of the virtual equipment subsets is M and M is 1 or a natural number greater than 1; and the displaying a combined equipment identifier of virtual combined equipment obtained by combining the virtual equipment subset and the first virtual equipment in the target game interface includes: displaying identifiers of M pieces of virtual combined equipment at positions adjacent to the identifiers of the second-class equipment of the M virtual equipment subsets in the target game interface.

Figure 9:
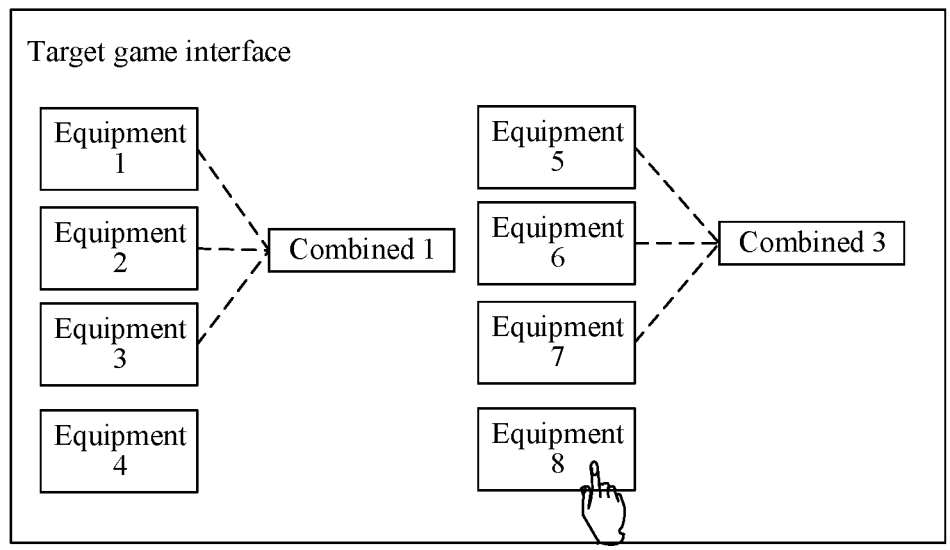
FIG. 9 is the seventh schematic diagram of an optional game interface according to an embodiment of this application.

In one embodiment, the first virtual equipment may be combined with a plurality of pieces of second-class equipment simultaneously, and the plurality of pieces of second-class equipment that can be used for simultaneous combination are of the same type. In this embodiment, the seventh schematic diagram of the target game interface shown in FIG. 9 shows that the first virtual equipment is Equipment 8; "Equipment 1", "Equipment 2" and "Equipment 3" can be combined with "Equipment 8" simultaneously into "Combined 1"; and "Equipment 5", "Equipment 6" and "Equipment 7" can be combined with "Equipment 8" simultaneously into "Combined 3". When the first triggering operation is performed on "Equipment 8", such as a clicking or dragging operation, the identifiers "Combined 1" and "Combined 3" of obtainable virtual combined equipment are displayed in the interface shown in FIG. 7. In this embodiment, the combined equipment identifier of each virtual combined equipment and the identifier of the corresponding second-class equipment may be placed adjacently, for example, in FIG. 9, "Combined 1" is displayed at a position adjacent to "Equipment 2", and "Combined 3" is displayed at a position adjacent to "Equipment 6". In this embodiment, the identifiers may be adjacent in up, down, left and right directions, and specific adjacent positions may be determined according to an actual situation, for example, "Combined 1" may be displayed at a position adjacent to the left side of "Equipment 1" or "Combined 1" may be displayed at a position adjacent to the upper side of "Equipment 3", etc. FIG. 9 illustrates this embodiment only as an example, and the present disclosure is not limited thereto.

In some embodiments, the displaying combined equipment identifiers of M pieces of virtual combined equipment at positions adjacent to the identifiers of the second-class equipment of the M virtual equipment subsets in the target game interface includes: displaying rightward from positions of the identifiers of the second-class equipment of the M virtual equipment subsets to display the combined equipment identifiers of the M pieces of virtual combined equipment in the target game interface, the M pieces of virtual combined equipment corresponding to the M virtual equipment subsets one by one.

Figure 10:
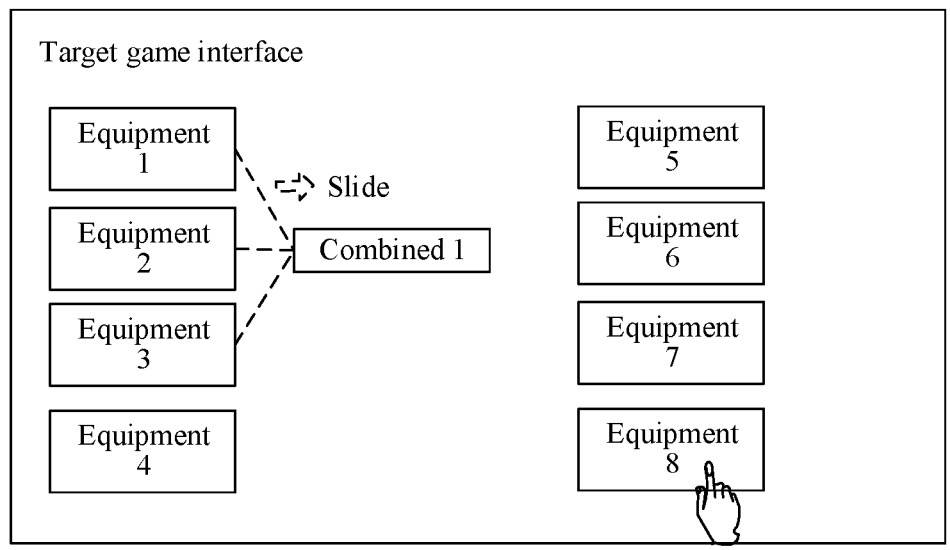
FIG. 10 is the eighth schematic diagram of an optional game interface according to an embodiment of this application.

In one embodiment, the combined equipment identifier of the virtual combine equipment may be dynamically displayed by sliding. For example, when the combined equipment identifier is displayed at the right side of the corresponding virtual equipment, the combined equipment identifier of the corresponding virtual combined equipment may be displayed by displaying rightward from a position where the identifier of the second-class equipment resides. In the eighth schematic diagram of the target game interface shown in FIG. 10, the identifier "Combined 1" is displayed by displaying rightward from positions where "Equipment 1", "Equipment 2" and "Equipment 3" reside. In this embodiment, a dynamic game interface may be shown in a manner of displaying by displaying rightward to improve the visual experience of players.

In some embodiments, S108 includes: in response to dragging the identifier of the first virtual equipment and dropping to the position overlapped with the identifier of the second virtual equipment, displaying a first prompt message in the target game interface, the first prompt message being used for identifying a confirmation prompt of combining the second virtual equipment and the first virtual equipment; and when a selection operation performed for the first prompt message is acquired, combining the second virtual equipment and the first virtual equipment to obtain the target combined equipment.

In one embodiment, if the identifier of the first virtual equipment is dragged and dropped to a position overlapped with the identifier of the second virtual equipment, a prompt message for confirming whether to combine the first virtual equipment and the second virtual equipment is displayed for the player in the target game interface. If the player confirms to perform combination, the second virtual equipment and the first virtual equipment are combined to obtain target combined equipment. In the ninth schematic diagram of a game interface according to an optional embodiment of this application shown in FIG. 11, if the player drags "Equipment 2" and drops to a position where "Equipment 1" resides to overlapped with "Equipment 1", "Confirm" and "Cancel" controls are displayed in the target game interface. If the player clicks "Confirm", it means that "Equipment 2" and "Equipment 1" are to be combined to obtain target combined equipment "Equipment 4".

In some embodiments, the method further includes: in response to dragging the identifier of the first virtual equipment and dropping to a position overlapped with the identifier of the second virtual equipment, canceling the displaying of an identifier of virtual combined equipment obtained by combining the target virtual equipment and the first virtual equipment, and displaying combination formula information of the first virtual equipment and the second virtual equipment; or, in response to dragging the identifier of the first virtual equipment and dropping to a position overlapped with an identifier of the second virtual equipment, canceling the displaying of a combined equipment identifier of virtual combined equipment obtained by combining the second virtual equipment and the first virtual equipment, and displaying combination formula information of the first virtual equipment and the second virtual equipment;

In one embodiment, in response to dragging the identifier of first virtual equipment and dropping to a position overlapped with the identifier of the second virtual equipment, canceling the displaying of a combined equipment identifier of virtual combined equipment obtained by combining the target virtual equipment and the first virtual equipment, and displaying combination formula information of the first virtual equipment and the second virtual equipment. In the game interface shown in FIG. 11, if the player drags "Equipment 8" and drops to a position where "Equipment 1" resides to be overlapped with "Equipment 1", only an identifier of virtual combined equipment obtained by combining "Equipment 8" and "Equipment 1" is displayed in the game interface, such as "Combined 1" displayed on the left side of "Equipment 1". In addition, combination formula information of "Equipment 8" and "Equipment 1" is also displayed in the game interface, that is, "Equipment 1+Equipment 8-Combined 1". However, the displaying of an identifier of virtual combined equipment formed by "Equipment 8" and virtual equipment such as "Equipment 2" and "Equipment 3" is canceled. In this embodiment, only the identifier of virtual combined equipment obtained by combining the first virtual equipment and the second virtual equipment and the information of the combination formula are displayed, such that the technical effects that the target game interface is simple, and the game experience of players is improved can be achieved.

Figure 12:
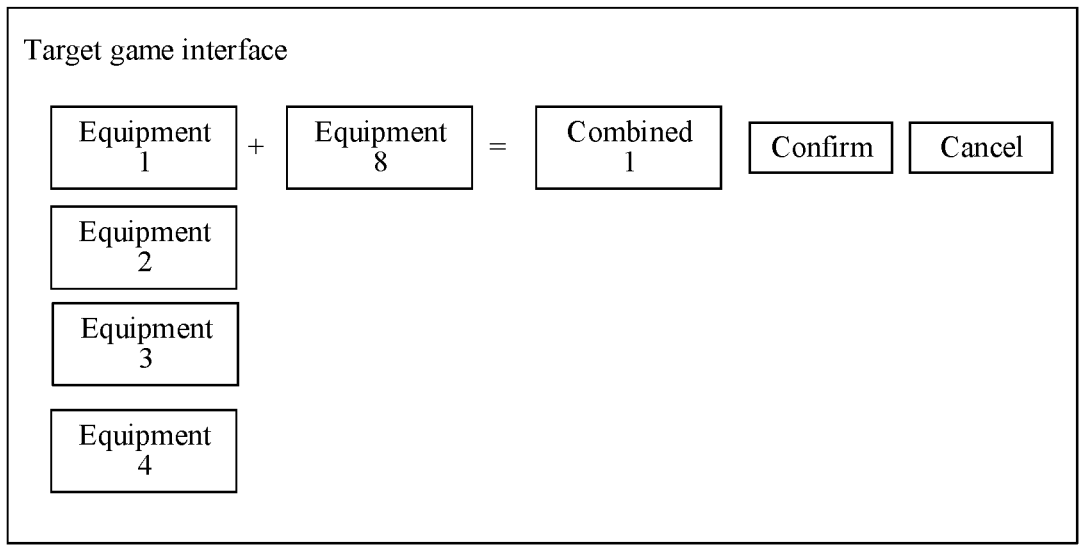
FIG. 12 is the tenth schematic diagram of an optional game interface according to an embodiment of this application.

In the tenth schematic diagram of the game interface shown in FIG. 12, if the player drags "Equipment 8" and drops to a position where "Equipment 1" resides to be overlapped with "Equipment 1", only combination formula information of "Equipment 8" and "Equipment 1" is displayed in the game interface, that is, "Equipment 1+Equipment 8=Combined 1". In this embodiment, only the information of the combination formula of the first virtual equipment and the second virtual equipment is displayed, such that the technical effects that the target game interface is simple, and the game experience of players is improved can be achieved.

In some embodiments, the method further includes: upon canceling the displaying of a combined equipment identifier of virtual combined equipment obtained by combining the target virtual equipment and the first virtual equipment and displaying combination formula information of the first virtual equipment and the second virtual equipment, in a case of canceling the dropping of the identifier of the first virtual equipment to a position overlapped with the identifier of the second virtual equipment, recovering the displaying of the combined equipment identifier of the virtual combined equipment obtained by combining the target virtual equipment and the first virtual equipment in the target game interface, and canceling the displaying of combination formula information of the first virtual equipment and the second virtual equipment; or, upon canceling the displaying of a combined equipment identifier of virtual combined equipment obtained by combining the second virtual equipment and the first virtual equipment and displaying combination formula information of the first virtual equipment and the second virtual equipment, in a case of canceling the dropping of the identifier of the first virtual equipment to a position overlapped with the identifier of the second virtual equipment, recovering the displaying of the combined equipment identifier of the virtual combined equipment obtained by combining the second virtual equipment and the first virtual equipment in the target game interface, and canceling the displaying of combination formula information of the first virtual equipment and the second virtual equipment.

Figure 11:
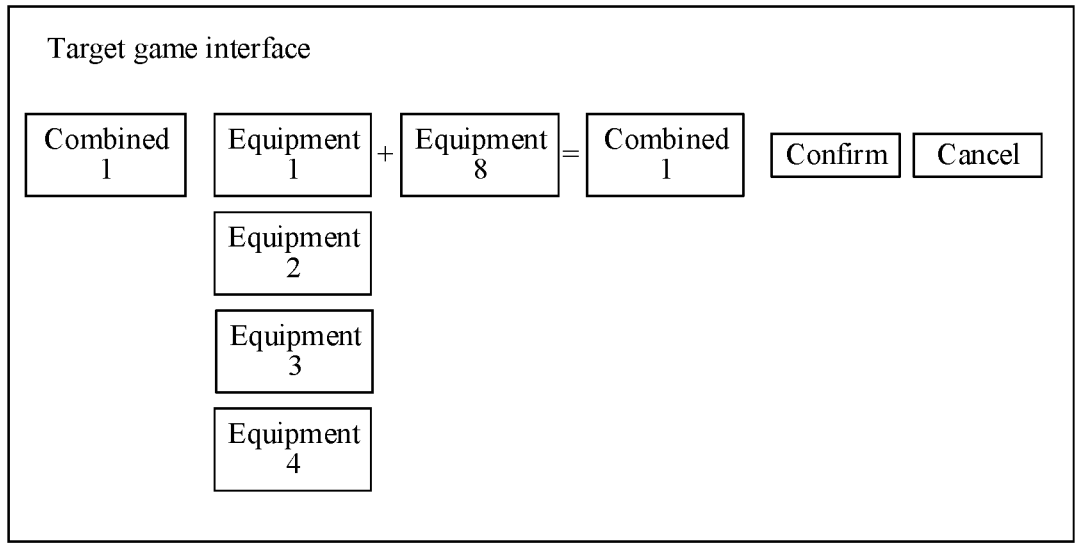
FIG. 11 is the ninth schematic diagram of an optional game interface according to an embodiment of this application.

In one embodiment, if the player cancels the dropping of the identifier of the first virtual equipment to a position where it is overlapped with the identifier of the second virtual equipment, the displaying of the combination formula information of the first virtual equipment and the second virtual equipment is canceled, and the displaying of the combined equipment identifier of the virtual combined equipment obtained by combining the target virtual equipment and the first virtual equipment is recovered. In particular, when canceling the dropping of the identifier of the first virtual equipment on a position where it is overlapped with the identifier of the second virtual equipment, the player may drag the identifier of the first virtual equipment to other positions in the game interface, and the other positions are ones other than the equipment column in the game interface. For example, after the game interface shown in FIG. 11 or FIG. 12 is displayed, if the player cancels the dropping of "Equipment 8" to a position where it is overlapped with the identifier "Equipment 1", the displaying of the game interface shown in FIG. 4 may be recovered.

In some embodiments, the method further includes: upon displaying a combined equipment identifier of virtual combined equipment obtained by combining the target virtual equipment and the first virtual equipment in the target game interface, acquiring a second triggering operation performed on the identifier of the first virtual equipment in the target game interface, the second triggering operation being used for canceling the displaying of the identifier of the virtual combined equipment; and in response to the second triggering operation, canceling the displaying of the combined equipment identifier of the virtual combined equipment in the target game interface.

In one embodiment, by taking the game interface shown in FIG. 4 as an example, if the player drags "Equipment 8", identifiers of virtual combined equipment obtained by combining Equipment 1 to Equipment 7 and Equipment 8 are displayed in the game interface. If the player cancels the dragging of "Equipment 8", the displaying of the identifier of the virtual combined equipment is canceled in the game interface, and the displaying of the game interface shown in FIG. 3 may be recovered. The second triggering operation may be the canceling of dragging of "Equipment 8". In this embodiment, the second triggering operation may also be the clicking of other positions in the game interface, and the other positions are ones other than the equipment column in the game interface. If the player clicks the other positions in the game interface, the displaying of the identifier of the virtual combined equipment in the game interface is canceled, and the game interface shown in FIG. 3 may be recovered.

In some embodiments, after S108, the method further includes displaying the combined equipment identifier of the target combined equipment as an identifier of virtual equipment obtained by the target virtual role in the target game interface.

In one embodiment, after the first virtual equipment and the second virtual equipment are combined to obtain target combined equipment, the target combined equipment is used as equipment that belongs to a virtual target object, and the identifier of the combined equipment may be displayed in the equipment column, such that the combined equipment is used by the player during the operation on the target virtual object.

In some embodiments, receiving a first triggering operation performed on the identifier of the first virtual equipment from the target game interface includes: acquiring a dragging operation performed on the identifier of the first virtual equipment from the target game interface, the first triggering operation including the dragging operation; or, acquiring a click operation performed on the identifier of the first virtual equipment from the target game interface, the first triggering operation including the triggering operation; or, acquiring a double click operation performed on the identifier of the first virtual equipment from the target game interface, the first triggering operation including the double triggering operation; or, acquiring a long press operation performed on the identifier of the first virtual equipment from the target game interface, the first triggering operation including the long press operation.

Figure 13:
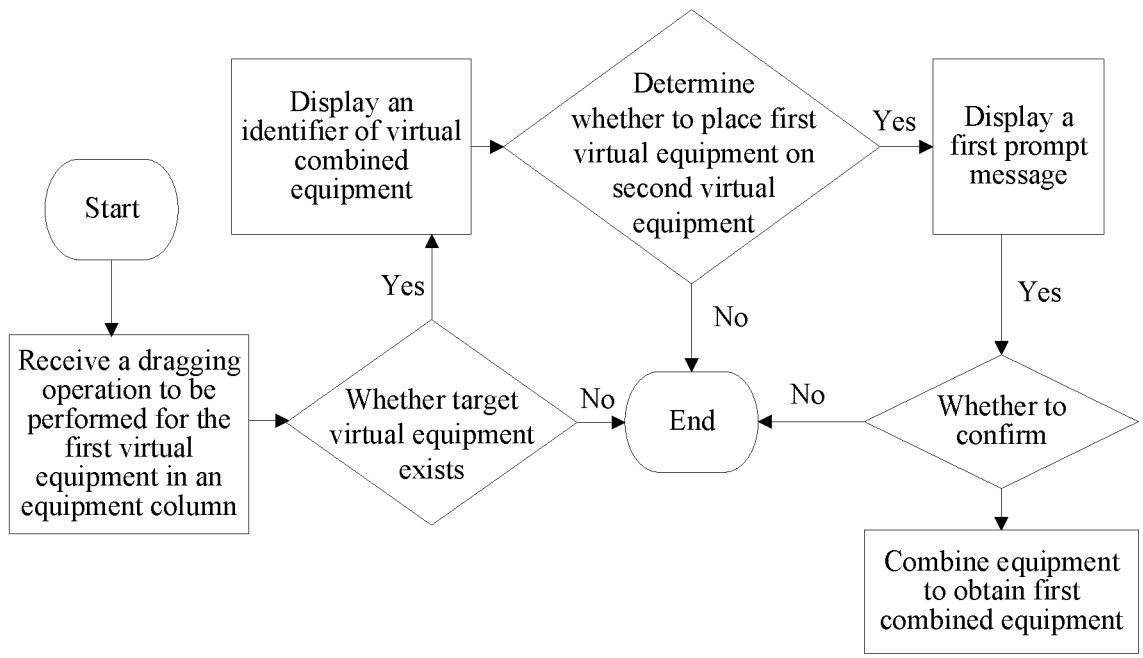
FIG. 13 is a schematic diagram of an optional flow according to an embodiment of this application.

In one embodiment, the first triggering operation may be a dragging operation, and may also be a click or double click or long press operation. In this embodiment, by taking the first triggering operation that is the dragging operation as an example, the schematic flowchart according to an optional embodiment of this application shown in FIG. 13 may include the following steps:

S1: Receive the dragging operation performed on the first virtual equipment in an equipment column.

S2: Detect whether target virtual equipment that is allowed to be combined with the first virtual equipment exists in the equipment column; if so, perform S3; otherwise perform S8.

S3: Display an identifier of combined equipment in a game interface.

S4: Determine whether to drop the first virtual equipment on the second virtual equipment; if so, perform S5; otherwise, perform S8.

S5: Display a first prompt message for confirming whether to combine the second virtual equipment and the first virtual equipment.

S6: Confirm whether to combine the second virtual equipment and the first virtual equipment; if so, perform S7; otherwise, perform S8.

S7: Combine the second virtual equipment and the first virtual equipment to obtain target combined equipment, and display the target combined equipment in the equipment column.

S8: End.

In this embodiment, by means of the above-mentioned steps, information can be rapidly previewed and goals, operation steps of games can be simplified, the operation cost of players can be reduced, and the intended attention of players can be focused on designated related module, such that the games are simple and easy to operate.

It should be noted that: For ease of description, the foregoing method embodiments are described as a series of action combinations. However, persons skilled in the art should know that the present invention is not limited to the described order of the actions because some steps may be performed in another order or performed at the same time according to the present invention. In addition, a person skilled in the art is also to learn that the embodiments described in this specification are all exemplary embodiments, and the involved actions and modules are not necessarily required to this application.

Figure 14:
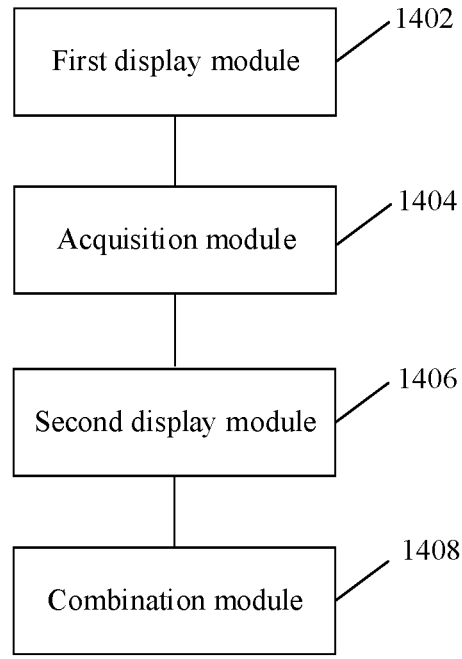
FIG. 14 is a schematic structural diagram of an optional apparatus for generating virtual equipment according to an embodiment of this application.

According to another aspect of the embodiments of this application, an apparatus for generating virtual equipment configured to perform the foregoing method for generating virtual equipment is further provided. As shown in FIG. 14, the apparatus includes: a first display module 1402 configured to display identifiers of virtual equipment obtained by a target virtual role in a target game interface, the virtual equipment obtained including first virtual equipment and second virtual equipment; an acquisition module 1404 configured to receive a first triggering operation performed on the identifier of the first virtual equipment from the target game interface; a second display module 1406 configured to in response to the first triggering operation, display a combined equipment identifier of virtual combined equipment obtained by combining the target virtual equipment and the first virtual equipment in the target game interface, the target virtual equipment being virtual equipment that is allowed to be combined with the first virtual equipment and includes the second virtual equipment; and a combination module 1408 configured to in response to dragging the identifier of the first virtual equipment and dropping to a position overlapped with an identifier of the second virtual equipment, combine the second virtual equipment and the first virtual equipment in the target game interface into target combined equipment corresponding to the combined equipment identifier.

In some embodiments, if the target virtual equipment includes a plurality of pieces of first-class equipment, the second display module is also configured to display combined equipment identifiers of virtual combined equipment obtained by combining the plurality of pieces of first-class equipment and the first virtual equipment in the target game interface, respectively, the first-class equipment being target virtual equipment that is allowed to be combined with the first virtual equipment separately to obtain the virtual combined equipment.

In some embodiments, the plurality of pieces of first-class equipment may be N pieces of first-class equipment, and the second display module is also configured to display combined equipment identifiers of N pieces of virtual combined equipment at positions adjacent to the identifiers of the N pieces of first-class equipment in the target game interface.

In some embodiments, the second display module is also configured to swipe rightward from positions of the identifiers of the N pieces of first-class equipment to display the combined equipment identifiers of the N pieces of virtual combined equipment in the target game interface.

In some embodiments, if the target virtual equipment includes a virtual equipment subset with a plurality of pieces of second-class equipment, the second display module is also configured to display a combined equipment identifier of virtual combined equipment obtained by combining the virtual equipment subset and the first virtual equipment in the target game interface, the plurality of pieces of second-class equipment in the virtual equipment subset being allowed to be commonly combined with the first virtual equipment to obtain one piece of virtual combined equipment; or if the target virtual equipment includes the virtual equipment subset and the first-class equipment, the second display module is also configured to display a combined equipment identifier of virtual combined equipment obtained by combining the virtual equipment subset and the first virtual equipment in the target game interface, and display a combined equipment identifier of virtual combined equipment obtained by combining the first-class equipment and the first virtual equipment, the first-class equipment being target virtual equipment that is allowed to be combined with the first virtual equipment separately to obtain the virtual combined equipment.

In some embodiments, the number of the virtual equipment subsets is M and M is 1 or a natural number greater than 1; and the second display module is also configured to display combined equipment identifiers of M pieces of virtual combined equipment at positions adjacent to the identifiers of the second-class equipment of the M virtual equipment subsets in the target game interface.

In some embodiments, the second display module is also configured to swipe rightward from positions of the identifiers of the second-class equipment of the M virtual equipment subsets to display the combined equipment identifiers of the M pieces of virtual combined equipment in the target game interface, the M pieces of virtual combined equipment corresponding to the M virtual equipment subsets one by one.

In some embodiments, the combination module is also configured to in response to dragging the identifier of the first virtual equipment and dropping to the position overlapped with the identifier of the second virtual equipment, display a first prompt message in the target game interface, the first prompt message being used for identifying a confirmation prompt of combining the second virtual equipment and the first virtual equipment; and when a selection operation performed for the first prompt message is acquired, combine the second virtual equipment and the first virtual equipment to obtain the target combined equipment.

In some embodiments, the second display module is also configured to in response to dragging the identifier of the first virtual equipment and dropping to a position overlapped with an identifier of the second virtual equipment, cancel the displaying of a combined equipment identifier of virtual combined equipment obtained by combining the target virtual equipment and the first virtual equipment, and display combination formula information of the first virtual equipment and the second virtual equipment; or, in response to dragging the identifier of the first virtual equipment and dropping to a position overlapped with an identifier of the second virtual equipment, cancel the displaying of a combined equipment identifier of virtual combined equipment obtained by combining the second virtual equipment and the first virtual equipment, and display combination formula information of the first virtual equipment and the second virtual equipment.

In some embodiments, the second display module is also configured to cancel the displaying of a combined equipment identifier of virtual combined equipment obtained by combining the target virtual equipment and the first virtual equipment and display combination formula information of the first virtual equipment and the second virtual equipment, in a case of canceling the dropping of the identifier of the first virtual equipment to a position overlapped with the identifier of the second virtual equipment, recover the displaying of a combined equipment identifier of virtual combined equipment obtained by combining the target virtual equipment and the first virtual equipment in the target game interface, and cancel the displaying of combination formula information of the first virtual equipment and the second virtual equipment; or, cancel the displaying of a combined equipment identifier of virtual combined equipment obtained by combining the second virtual equipment and the first virtual equipment and display combination formula information of the first virtual equipment and the second virtual equipment, in a case of canceling the dropping of the identifier of the first virtual equipment to a position overlapped with the identifier of the second virtual equipment, recover the displaying of a combined equipment identifier of virtual combined equipment obtained by combining the second virtual equipment and the first virtual equipment in the target game interface, and cancel the displaying of combination formula information of the first virtual equipment and the second virtual equipment.

In some embodiments, the apparatus is configured to acquire a second triggering operation performed on the identifier of the first virtual equipment in the target game interface after displaying a combined equipment identifier of virtual combined equipment obtained by combining the target virtual equipment and the first virtual equipment in the target game interface, the second triggering operation being used for canceling the displaying of the identifier of the virtual combined equipment; and in response to the second triggering operation, cancel the displaying of the combined equipment identifier of the virtual combined equipment in the target game interface.

In some embodiments, the apparatus is configured to display the combined equipment identifier of the target combined equipment as an identifier of virtual equipment obtained by the target virtual role in the target game interface.

In some embodiments, the apparatus is configured to receive a first triggering operation performed on the identifier of the first virtual equipment from the target game interface through the following steps: acquiring a dragging operation performed on the identifier of the first virtual equipment from the target game interface, the first triggering operation including the dragging operation; or, acquiring a click operation performed on the identifier of the first virtual equipment from the target game interface, the first triggering operation including the click operation; or, acquiring a double click operation performed on the identifier of the first virtual equipment from the target game interface, the first triggering operation including the double click operation; or, acquiring a long press operation performed on the identifier of the first virtual equipment from the target game interface, the first triggering operation including the long press operation.

Figure 15:
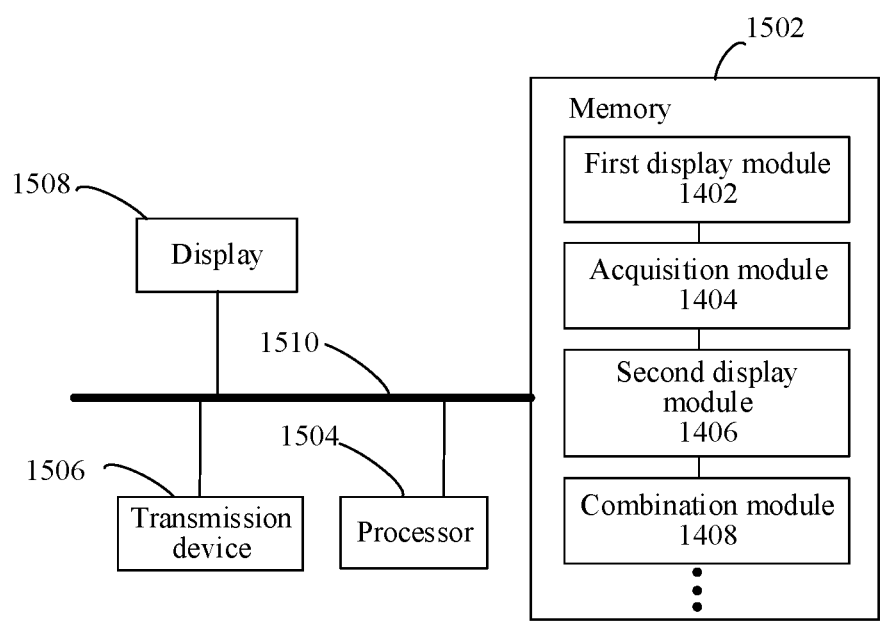
FIG. 15 is a schematic structural diagram of an optional electronic device according to an embodiment of this application.

According to another aspect of the embodiments of this application, an electronic device for implementing the method for generating virtual equipment is provided. The electronic device may be a terminal device or server shown in FIG. 1. This embodiment is illustrated by taking this electronic device that is the terminal device as an example. As shown in FIG. 15, the electronic device includes a memory 1502 and a processor 1504. The memory 1502 stores a computer program. The processor 1504 is configured to perform the steps in any one of the foregoing method embodiments by executing the computer program.

In some embodiments, in this embodiment, the foregoing electronic device may be located in at least one of a plurality of network devices in a computer network.

In some embodiments, in this embodiment, the processor may be set to implement the following steps through a computer program:

S1: Display identifiers of virtual equipment obtained by a target virtual role in a target game interface, the virtual equipment obtained including first virtual equipment and second virtual equipment.

S2: Receive a first triggering operation performed on the identifier of the first virtual equipment from the target game interface.

S3: In response to the first triggering operation, display a combined equipment identifier of virtual combined equipment obtained by combining target virtual equipment and the first virtual equipment in the target game interface, the target virtual equipment being virtual equipment that is allowed to be combined with the first virtual equipment and including the second virtual equipment.

S4: In response to dragging the identifier of the first virtual equipment and dropping to a position overlapped with an identifier of the second virtual equipment, combine the second virtual equipment and the first virtual equipment in the target game interface into target combined equipment corresponding to the combined equipment identifier.

In some embodiments, a person of ordinary skill in the art may understand that the structure shown in FIG. 15 is only schematic. Alternatively, the electronic apparatus and the electronic device may be a terminal device such as a smartphone (for example, an Android mobile phone or an iOS mobile phone), a tablet computer, a palmtop computer, a mobile Internet device (MID), or a PAD. FIG. 15 does not limit the structure of the foregoing electronic apparatus and electronic device. For example, the electronic apparatus and the electronic device may further include more or fewer components (such as a network interface) than shown in FIG. 15, or have a configuration different from that shown in FIG. 15.

The memory 1502 may be configured to store a software program and a module, for example, a program instruction/module corresponding to the method for generating virtual equipment and apparatus in the embodiments of this application, and the processor 1504 performs various functional applications and data processing by running a software program and a module stored in the memory 1502, that is, implementing the foregoing method for generating virtual equipment. The memory 1502 may include a high-speed RAM, and may further include a non-volatile memory such as one or more magnetic storage apparatuses, a flash memory, or another non-volatile solid-state memory. In some embodiments, the memory 1502 may further include memories remotely disposed relative to the processor 1504, and these remote memories may be connected to the terminal through a network. The foregoing examples of the network include, but are not limited to, the Internet, an intranet, a local area network, a mobile communication network, and a combination thereof. The memory 1502 may be specifically configured to, but is not limited to, store information such as identifiers of virtual equipment. As an example, as shown in FIG. 15, the memory 1502 may include, but is not limited to, the first display module 1402, the obtaining module 1404, the second display module 1406, and the combination module 1408 in the foregoing apparatus for generating virtual equipment. In addition, the memory may further include, but is not limited to, other modules or units in the foregoing generating apparatus of virtual equipment, and details are not described in this example again.

In some embodiments, the transmission apparatus 1506 is configured to receive or transmit data through a network. Specific examples of the network include a wired network and a wireless network. In an example, the transmission apparatus 1506 includes an NIC. The NIC may be connected to another network device and a router by using a network cable, so as to communicate with the Internet or a local area network. In an example, the transmission apparatus 1506 is a radio frequency (RF) module, and is configured to wirelessly communicate with the Internet.

In addition, the electronic device further includes: a display 1508 configured to display the order information to be processed; a connection bus 1510, configured to connect various module components in the electronic device.

In other embodiments, the foregoing terminal device or server may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various optional implementations. The computer program is set to perform the steps in any one of the method embodiments of according to any one of aspects during running.

In some embodiments, in this embodiment, the computer-readable storage medium may be configured to store a computer program configured to perform the following steps:

S1: Display identifiers of virtual equipment obtained by a target virtual role in a target game interface, the virtual equipment obtained including first virtual equipment and second virtual equipment.

S2: Receive a first triggering operation performed on the identifier of the first virtual equipment from the target game interface.

S3: In response to the first triggering operation, display a combined equipment identifier of virtual combined equipment obtained by combining target virtual equipment and the first virtual equipment in the target game interface, the target virtual equipment being virtual equipment that is allowed to be combined with the first virtual equipment and including the second virtual equipment.

S4: In response to dragging the identifier of the first virtual equipment and dropping to a position overlapped with an identifier of the second virtual equipment, combine the second virtual equipment and the first virtual equipment in the target game interface into target combined equipment corresponding to the combined equipment identifier.

In some embodiments, in this embodiment, a person of ordinary skill in the art may understand that all or some of the steps of the various methods in the foregoing embodiments may be implemented by a program instructing relevant hardware. The program may be stored in a computer-readable storage medium. The storage medium may include: a flash drive, a Read-Only Memory (ROM), a Random Access Memory (RAM), a magnetic disk, an optical disc, and the like.

In addition, an embodiment of this application further provides a storage medium. The storage medium is configured to store a computer program. The computer program is configured to perform the methods provided in the foregoing embodiments.

An embodiment of this application further provides a computer program product including instructions, the instructions, when run on a computer, causing the computer to perform the method according to the foregoing embodiments.

The sequence numbers of the foregoing embodiments of this application are merely for description purpose, and do not indicate the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, it is to be understood that the disclosed client may be implemented in other manners. The described apparatus embodiments are merely exemplary. For example, the unit division is merely logical function division and may be other division during various implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

It should be noted that the foregoing descriptions are merely preferred embodiments of the present invention, and a person of ordinary skill in the art may make various improvements and modifications without departing from the spirit of the present disclosure. All such improvements and refinements shall fall within the protection scope of the present disclosure.

What is claimed is:

1. A method for generating virtual equipment, performed by a terminal device, the method comprising:
  displaying identifiers of virtual equipment in a target game interface, the virtual equipment comprising first virtual equipment and second virtual equipment;
  receiving a first triggering operation performed on the identifier of the first virtual equipment from the target game interface;

in response to the first triggering operation, displaying a candidate identifier of a first fused virtual equipment, the first fused virtual equipment is a fusion of the second virtual equipment and the first virtual equipment in the target game interface; and in response to dragging the identifier of the first virtual equipment and dropping the identifier at a position overlapped with an identifier of the second virtual equipment, fusing the second virtual equipment and the first virtual equipment, wherein displaying the candidate identifier of the first fused virtual equipment comprises:

when a target virtual equipment comprises N number of first-class equipment, respectively displaying equipment identifiers of N number of fused virtual equipment at positions adjacent to identifiers of the N number of first-class equipment in the target game interface, each of the N number of the first-class equipment being the target virtual equipment that can be fused with the first virtual equipment separately to obtain one of the N number of the fused virtual equipment.

2. The method according to claim 1, wherein the virtual equipment is possessed by a target virtual role, and the method further comprises:

granting the first fused virtual equipment to the target virtual role.

3. The method according to claim 1, wherein the virtual equipment further comprises a third virtual equipment, and the method further comprising:

in response to the first triggering operation, displaying a candidate identifier of a second fused virtual equipment, the second fused virtual equipment is a fusion of the third virtual equipment and the first virtual equipment.

4. The method according to claim 3, wherein the displaying the candidate identifier of the second fused virtual equipment comprises:

displaying rightward from a position of the identifier of the second virtual equipment the candidate identifier of the first fused virtual equipment.

5. The method according to claim 1, wherein displaying a candidate identifier of a first fused virtual equipment further comprising:

displaying candidate identifier of a first fused virtual equipment at positions adjacent to the identifier of the second virtual equipment.

6. The method according to claim 1, the in response to dragging the identifier of the first virtual equipment and dropping at a position overlapped with an identifier of the second virtual equipment, fusing the second virtual equipment and the first virtual equipment comprises:

in response to dragging the identifier of the first virtual equipment and dropping to the position overlapped with the identifier of the second virtual equipment, displaying a first prompt message in the target game interface, the first prompt message being used for receiving a confirmation of combining the second virtual equipment and the first virtual equipment; and when the confirmation is received, fusing the second virtual equipment and the first virtual equipment.

7. The method according to claim 1, further comprising:

in response to dragging the identifier of the first virtual equipment and dropping at a position overlapped with the identifier of the second virtual equipment, displaying combination formula information of the first virtual equipment and the second virtual equipment.

8. The method according to claim 7, further comprising:

in response to dragging the identifier of the first virtual equipment and dropping at the position overlapped with the identifier of the second virtual equipment, canceling the displaying of an equipment identifier of fused virtual equipment obtained by combining the target virtual equipment and the first virtual equipment.

9. The method according to claim 1, further comprising:

in response to dragging the identifier of the first virtual equipment and dropping the identifier at a position overlapped with an identifier of the second virtual equipment, fusing the second virtual equipment and the first virtual equipment without engaging a carrier for equipment generation.

10. A non-transitory computer-readable storage medium, configured to store a computer program, the computer program, when run by at least one processor, causing the at least one processor to perform:

displaying identifiers of virtual equipment obtained by a target virtual role in a target game interface, the virtual equipment obtained comprising first virtual equipment and second virtual equipment;

receiving a first triggering operation performed on the identifier of the first virtual equipment from the target game interface;

in response to the first triggering operation, displaying a candidate equipment identifier of fused equipment obtained by combining target virtual equipment and the first virtual equipment in the target game interface, the target virtual equipment being virtual equipment that can be fused with the first virtual equipment and comprising the second virtual equipment; and in response to dragging the identifier of the first virtual equipment and dropping the identifier at a position overlapped with an identifier of the second virtual equipment, fusing the second virtual equipment and the first virtual equipment, wherein displaying the candidate identifier of the first fused virtual equipment comprises:

when a target virtual equipment comprises N number of first-class equipment, respectively displaying equipment identifiers of N number of fused virtual equipment at positions adjacent to identifiers of the N number of first-class equipment in the target game interface, each of the N number of the first-class equipment being the target virtual equipment that can be fused with the first virtual equipment separately to obtain one of the N number of the fused virtual equipment.

11. The computer-readable storage medium according to claim 10, wherein the respectively displaying the equipment identifiers of N number of fused virtual equipment at positions adjacent to the number of the N pieces of first-class equipment in the target game interface comprises:

respectively displaying rightward from positions of the identifiers of the N number of first-class equipment to display the equipment identifiers of the N number of fused virtual equipment in the target game interface.

12. The computer-readable storage medium according to claim 10, wherein the displaying an equipment identifier of fused virtual equipment obtained by combining target virtual equipment and the first virtual equipment in the target game interface comprises:

when the target virtual equipment comprises a virtual equipment subset with a plurality of second-class equipment, displaying an equipment identifier of fused virtual equipment obtained by combining the virtual equipment subset and the first virtual equipment in the target game interface, the plurality of second-class equipment in the virtual equipment subset being able to together be fused with the first virtual equipment to obtain one piece of fused virtual equipment; or when the target virtual equipment comprises the virtual equipment subset and the first-class equipment, displaying an equipment identifier of fused virtual equipment obtained by combining the virtual equipment subset and the first virtual equipment in the target game interface, and displaying an equipment identifier of fused virtual equipment obtained by combining the first-class equipment and the first virtual equipment, the first-class equipment being target virtual equipment that can be combined with the first virtual equipment separately into the fused virtual equipment.

13. The computer-readable storage medium according to claim 12, wherein the number of the virtual equipment subsets is M and M is 1 or a natural number greater than 1; the displaying an equipment identifier of fused virtual equipment obtained by combining the virtual equipment subset and the first virtual equipment in the target game interface comprises:

displaying equipment identifiers of M number pieces of fused virtual equipment at positions adjacent to the identifiers of the second-class equipment of the M virtual equipment subsets in the target game interface.

14. An electronic device, comprising a memory and a processor, the memory storing a computer program, and the processor being configured to perform:

displaying identifiers of virtual equipment obtained by a target virtual role in a target game interface, the virtual equipment obtained comprising first virtual equipment and second virtual equipment;

receiving a first triggering operation performed on the identifier of the first virtual equipment from the target game interface;

in response to the first triggering operation, displaying an equipment identifier of fused virtual equipment obtained by combining target virtual equipment and the first virtual equipment in the target game interface, the target virtual equipment being virtual equipment that can be combined with the first virtual equipment and comprising the second virtual equipment; and in response to dragging the identifier of the first virtual equipment and dropping the identifier at a position overlapped with an identifier of the second virtual equipment, combining the second virtual equipment and the first virtual equipment, wherein displaying the candidate identifier of the first fused virtual equipment comprises:

when a target virtual equipment comprises N number of first-class equipment, respectively displaying equipment identifiers of N number of fused virtual equipment at positions adjacent to identifiers of the N number of first-class equipment in the target game interface, each of the N number of the first-class equipment being the target virtual equipment that can be fused with the first virtual equipment separately to obtain one of the N number of the fused virtual equipment.

15. The electronic device according to claim 14, wherein the in response to dragging the identifier of the first virtual equipment and dropping at a position overlapped with an identifier of the second virtual equipment, combining the second virtual equipment and the first virtual equipment comprises:

in response to dragging the identifier of the first virtual equipment and dropping to the position overlapped with the identifier of the second virtual equipment, displaying a first prompt message in the target game interface, the first prompt message being used for receiving a confirmation of combining the second virtual equipment and the first virtual equipment; and when the confirmation is received, fusing the second virtual equipment and the first virtual equipment.

16. The electronic device according to claim 14, wherein the processor is further configured to perform:

in response to dragging the identifier of the first virtual equipment and dropping at a position overlapped with the identifier of the second virtual equipment, displaying combination formula information of the first virtual equipment and the second virtual equipment.

17. The electronic device according to claim 16, wherein the processor is further configured to perform:

in response to dragging the identifier of the first virtual equipment and dropping at the position overlapped with the identifier of the second virtual equipment, canceling the displaying of an equipment identifier of fused virtual equipment obtained by combining the target virtual equipment and the first virtual equipment.

18. The electronic device according to claim 14, wherein the processor is further configured to perform:

in response to dragging the identifier of the first virtual equipment and dropping the identifier at a position overlapped with an identifier of the second virtual equipment, fusing the second virtual equipment and the first virtual equipment without engaging a carrier for equipment generation.

* * * * *